(12) United States Patent
Larcum

(10) Patent No.: X9735
(45) Date of Patent: Jun. 16, 1836

(54) WASHING MACHINE

(76) Inventor: Amos Larcum

Amos Larcom
Letters Patent

The Schedule referred to in these Letters Patent and making part
of the same containing a description in the words of the said Amos
Larcom himself of his improvement in the machine for Wash-
ing Clothes
To all to whom these presents shall come. Be it
known that I Amos Larcom of the city of Troy in the County of
Rensselaer and State of New York have invented a new and
usefull improvement in washing and Cleansing clothes and
that the following is a full and exact description thereof.—
Washing Machines to which the improvement here to be described
is applicable consist of rectangular box about two feet square and
two feet deep within which is placed a cylindrical drum of a
length and diameter equal to the inside of the box excepting a
space between the end sides and bottom of the box and the cylin-
der of about half an inch. The outside of the drum is formed of
slats or rounds firmly fixed to circular ends and placed a-
bout one fourth of an inch apart. The cylinder is to be sus-
pended upon gudgeons attached to the ends and made to
rest and turn freely in metal or other boxes fixed in the box
which encloses the cylinder. One of the gudgeons should be ex
tended out so as to admit a crank upon the end for turning the
cylinder. The top of the box which encloses the cylinder should
be covered. One side of which or the whole should be made to op
en as a lid upon hinges or a door instead be provided in the top
to be attached with hinges. The cylinder also should be provid
ed with a door or opening, through these openings the clothes are
to be introduced and taken out. The opening of the cylinder should
be about eight inches wide and the door which is to close it should
be formed of slats or rounds attached at each end to a segment of a circle
corresponding with the curve of the cylinder and about [illegible]
from from the convex to the concave edge. The bed for the door is to be formed by cutting down a shoulder on the inside of each head of the cylinder equal to about half its thickness so as to admit the end segments of the door and the slats attached thereto to one uniform circle with the rest of the cylinder. The ends of the segments on one side of this door and the corresponding end of the bed for each taking them from the outer to the inner edge should be made to terminate in an angle of about fifty degrees so as to match in form of a dove tail on that side. While the other ends terminating in the direction of the radius of the cylinder may be closed down last & secured by a button at or near the centre of the slats. In forming the outside of the cylinder, two slats are to be placed opposite each other and a row of wooden pins about four in each attached or fixed in perforations through the slat. The pins should be about one and one fourth of an inch in diameter extending in towards the centre of the cylinder about three inches. The process of washing or cleansing the clothes is this. They are placed within the cylinder the door of which is closed down and buttoned. The cylinder is then turned by the outside crank by which movement the pins take them round to such elevation as shall cause them to slide off against the opposite side of the cylinder and falling before the other row of pins they are again taken up in the same manner & so on in succession — And the movement of the cylinder as to its velocity should be such as to produce that effect: By this process & agitation with the aid of hot water or steam or both clothes are washed & cleansed. Now the improvement hereby claimed and which is applicable to washing machines constructed upon the principles of the foregoing description consists in the heating the water for this process by the application of steam within the machine. For this purpose a boiler of copper, tin or other suitable material is to be provided the dimensions of which may be such as to be placed over a common portable furnace of medium size or a kitchen stove or it may be heated heated in any other way at discretion. It should be covered in
closed by soldering, riveting or otherwise so as to be steam tight
excepting a passage for the steam as it is generated by means of
a pipe from the boiler to the machine. this may be about one and
one fourth of an inch in diameter. It should be made to enter the
machine box near the bottom and below the surface of the wa-
ter within it so that the steam shall be condensed by and within the wa-
ter and thereby impart to it the heat it contains. In order
to prevent the water in the machine from running into the
steam pipe to any considerable distance the pipe should ap-
proach the machine a little above say six inches or more
above the level of its entrance and then descend to it by means
of elbows or otherwise. A little forward of the end of the pipe
within the machine an apron of wood should be placed a-
bout four inches wide. The upper edge of which should be
attached to the side of the box running parallel with the
cylinder and the ends of the apron fitted and attached to
the respective ends of the box so as to give it in its crosswise
direction an inclination downwards of about forty five
degrees. by which the lower edge is to be brought to within a-
bout an inch and an half of the bottom of the box. This apron
and the angular apartment which is formed by it are for
the purpose of forcing the steam under the edge of the a-
pron and therefore of necessity into the water at the bottom
of the machine (assuming that it will always be more
than an inch & one half deep) in case it shall have escaped
being condensed by the water as it is discharged from the steam
pipe. What I claim of the above described improvement
as new and my own invention is the use and application of
steam within the machine for heating water for washing,
cleansing or rinsing clothes by causing the steam to be condensed
by and within the water therein and by the same means in-
creasing its temperature so as to generate steam within the ma-
chine chine as the cleansing process may require Witnesses Amos Larcom Geo Wheeler Eleazer Brokes (1176 words)

Drawing Made